United States Patent [19]
Falcone et al.

[11] Patent Number: 5,396,264
[45] Date of Patent: Mar. 7, 1995

[54] AUTOMATIC MENU ITEM SEQUENCING METHOD

[75] Inventors: Frank Falcone, Loxahatchee; Eugene Lopatukhin, West Palm Beach; Greg Coonley, Lake Worth, all of Fla.

[73] Assignee: Motorola, Inc., Schaumburg, Ill.

[21] Appl. No.: 176,755

[22] Filed: Jan. 3, 1994

[51] Int. Cl.⁶ .............................................. G09G 1/06
[52] U.S. Cl. .................................... 345/146; 345/115; 340/825.44; 340/825.5
[58] Field of Search ............... 345/115, 119, 120, 146, 345/; 340/825.44, 825.47, 825.48, 825.5; 379/354, 355

[56] References Cited

U.S. PATENT DOCUMENTS

| | | |
|---|---|---|
| 4,754,423 | 6/1988 | Rollins . |
| 4,788,543 | 11/1988 | Rubin ............................. 340/825.44 |
| 4,885,580 | 12/1989 | Noto .................................. 379/355 |
| 4,949,085 | 8/1990 | Fisch et al. ..................... 340/825.44 |
| 5,075,684 | 12/1991 | DeLuca .......................... 340/825.44 |
| 5,105,189 | 4/1992 | Murai et al. ................... 340/825.44 |
| 5,182,553 | 1/1993 | Kung .............................. 340/825.44 |
| 5,267,308 | 11/1993 | Jokinen et al. ...................... 379/355 |

Primary Examiner—Ulysses Weldon
Assistant Examiner—Matthew Luu
Attorney, Agent, or Firm—D. Andrew Floam

[57] ABSTRACT

A portable information display device such as a pager (20) has a plurality of operating modes and a corresponding plurality of menu items (40, 140). A symbol (40, 142) corresponding each menu item is displayed on a display (22) in a sequence determined by a priority (46) of the menu item. The priority (46) of each menu item (40, 140) is determined in response to either a frequency of selection of the corresponding operating mode (44), or a default value assigned to the menu item (42, 142) or both.

10 Claims, 5 Drawing Sheets

| PRIORITY (46) | FREQUENCY (44) | DEFAULT (42) | MODE / MENU ITEM / SYMBOL (40) |
|---|---|---|---|
| 1 | 220 | 1 | READ MESSAGES |
| 2 | 124 | 8 | PROTECT MESSAGES |
| 3 | 81 | 4 | SET ALERT VOLUME |
| 4 | 82 | 7 | ERASE MESSAGES |
| 5 | 60 | 9 | POWER OFF |
| 6 | 45 | 3 | SET ALARM |
| 7 | 40 | 12 | SET ALERT MELODY |
| 8 | 33 | 2 | AUTO/MANUAL POWER |
| 9 | 25 | 5 | SET AUTO POWER TIME |
| 10 | 20 | 6 | SET TIME OF DAY |
| 11 | 16 | 10 | SET READ MODE |
| 12 | 10 | 11 | CHRONOGRAPH |
| 13 | 5 | 13 | SET DEFAULT |

| PRIORITY | FREQUENCY | DEFAULT | MODE / MENU ITEM / SYMBOL |
|---|---|---|---|
| 1 | 220 | 1 | READ MESSAGES |
| 2 | 124 | 8 | PROTECT MESSAGES |
| 3 | 81 | 4 | SET ALERT VOLUME |
| 4 | 82 | 7 | ERASE MESSAGES |
| 5 | 60 | 9 | POWER OFF |
| 6 | 45 | 3 | SET ALARM |
| 7 | 40 | 12 | SET ALERT MELODY |
| 8 | 33 | 2 | AUTO/MANUAL POWER |
| 9 | 25 | 5 | SET AUTO POWER TIME |
| 10 | 20 | 6 | SET TIME OF DAY |
| 11 | 16 | 10 | SET READ MODE |
| 12 | 10 | 11 | CHRONOGRAPH |
| 13 | 5 | 13 | SET DEFAULT |

| PRIORITY | FREQUENCY | DEFAULT ICON SYMBOL | MODE / MENU ITEM |
|---|---|---|---|
| 1 | 220 | 1 | READ MESSAGES |
| 2 | 124 | 8 | PROTECT MESSAGES |
| 3 | 81 | 4 | SET ALERT VOLUME |
| 4 | 82 | 7 | ERASE MESSAGES |
| 5 | 60 | 9 | POWER OFF |
| 6 | 45 | 3 | SET ALARM |
| 7 | 40 | 12 | SET ALERT MELODY |
| 8 | 33 | 2 | AUTO/MANUAL POWER |
| 9 | 25 | 5 | SET AUTO POWER TIME |
| 10 | 20 | 6 | SET TIME OF DAY |
| 11 | 16 | 10 | SET READ MODE |
| 12 | 10 | 11 | CHRONOGRAPH |

AUTOMATIC MENU ITEM SEQUENCING METHOD

FIELD OF THE INVENTION

This invention relates generally to electronic devices, including portable paging receivers, having a plurality of user selectable operating modes.

BACKGROUND OF THE INVENTION

As the complexity of electronic devices increases, the number of user selectable operating modes of the devices correspondingly increases. For miniature electronic devices such as portable paging receivers, providing a convenient method for rapid selection of most desired operating modes becomes difficult. This is due in part to the miniature size of the device.

For example, common prior art pagers had only a few operating modes such as "read", "protect", and "delete". Presenting a predetermined sequence of menu items for selection of these few modes proved trivial. However, with the advent of improved microcomputers with increased memory for use in these devices, the number of possible operating modes has increased to a dozen or more. The modes may now include: "read", "protect", "set alert volume", "erase", "off", "set alarm", "set alert melody", "auto/manual power", "set auto power time", "set time of day", "set read mode", and "chronograph". However, mode selection tools typically available to PCs users, such as a large graphic monitor, a full alpha key board and a mouse, are not available to users of such miniature electronic devices. Thus, the methods used on a PC to select operating modes may not readily adapt to miniature devices. Due to the miniature nature of the device the size of the display and the number and type of user controls are limited. For example, a typical display may be less than two square inches or twelve and a half square centimeters and the device may have only a few switches and no mouse. On such a miniature device, menu items allowing the user to select a desired mode are presented in a predetermined sequence. The user then navigates sequentially through the sequence of menu items to select the desired operating mode.

A problem arises when one user desires a certain set of operating modes which are different from those of another user. Attempting to solve this problem with a predetermined sequence of menu items cannot not satisfy all users of the devices. For example, a first user may frequently use the device's chronograph mode for timing sporting events, and thus would prefer to have the menu item corresponding to the chronograph mode occur early in the sequence of menu items. On the other hand, another user with many appointments may prefer to use the device's alarm modes while having little or no use for the device's chronograph functions. This user would prefer to have menu items corresponding to the device's alarm functions occur early in the sequence of menu items while having the chronograph menu item occur last in the sequence of menu items. Consequently, it is not possible to design a predetermined sequence of menu items capable of satisfying both users.

Thus, what is needed is a method for adjusting the sequence of menu items on an electronic device to correspond to the way the user uses the device.

BRIEF SUMMARY OF THE INVENTION

In a portable information display device having a plurality of operating modes and a corresponding plurality of menu items, a method /f providing for selection by a user of the device of one of the plurality menu items comprises the steps of monitoring selection by the user of each of the plurality of operating modes, and selecting a first menu item from the plurality of menu items in response to said step of monitoring.

DETAILED DESCRIPTION OF THE INVENTION

Figures 1, 2:
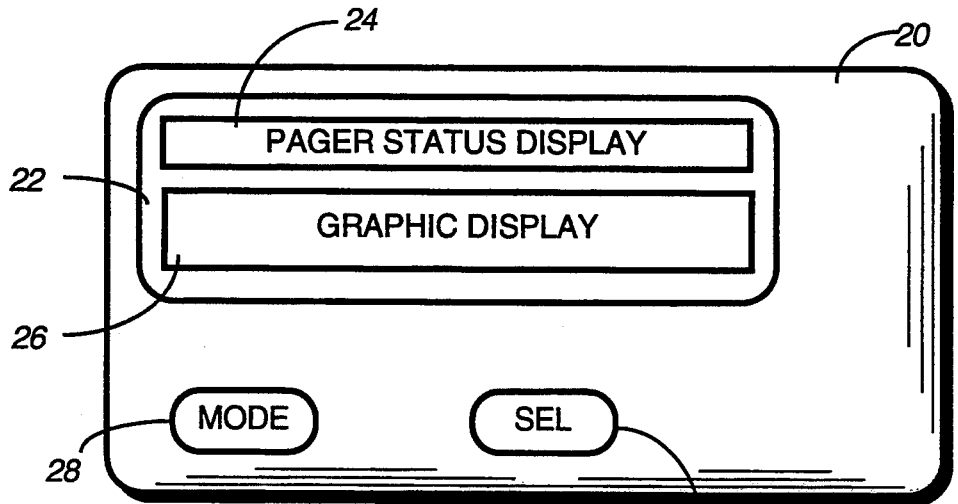
FIG. 1 shows a front view of a device operating in accord with the preferred embodiment of the present invention.
FIG. 2 shows a table of menu items in accord with the preferred embodiment of the present invention.

FIG. 1 shows a front view of a device 20 operating in accord with the preferred embodiment of the present invention. The paging device has a display area 22 for communicating message information to the user. The display area is preferably comprised of a display means such as a Liquid Crystal Display (LCD). Display area 22 has a pager status display area 24 for indicating various statuses of the pager. For example, the status area indicates time stamp information, out of range, auto-on off, as well as alert type and alarm statuses. Display area 22 also has a graphic display area 26 which is capable of displaying both text and graphic information. Graphic display 26 may be used for displaying message information received by the pager as well as menu items for mode selection of the pager. Pager 20 also has a mode switch 28 and a select switch 30 which are preferably push button switches. These switches enable the user to control the operation of the pager, including the viewing of a mode selection menu and selection of operating modes from the menu.

FIG. 2 shows a table of menu items in accord with the preferred embodiment of the present invention. The table includes a plurality of operating modes and a corresponding plurality of menu items. Column 40 is a list of menu items from which the user may select an operating mode of the pager. In the preferred embodiment, the symbol corresponding to the menu item displayed on graphic display 26 is the same as the text contained in column 40. In alternate embodiments, the symbol could be a foreign language equivalent of the text or a representative icon. Column 42 represents the default priority assigned to each menu item which indicates an initial sequence of the menu item. Column 44 represents the number of times a user has selected a particular operating mode of the pager. Column 46 represents the priority of the menu item in the sequence that it will be displayed in display area 26. As will be explained with reference to FIG. 3, the priority is a function of both the default 42 and frequency 44 columns.

The operating modes of column 40 are typical of pagers. The read messages mode allows the user to view messages received by the pager. The protect messages mode allows the user to prevent selected messages from being deleted. The set alert volume mode allows the user to set the SPL level of the alert including silent mode and vibratory alerts. The erase messages mode allows the user to delete unwanted messages from the memory of the pager. The power off mode allows the user to manually switch the pager off. The set alarm mode allows the user set the time that an alarm will sound. The set melody alert allows the user to choose from a set of predetermined alert melodies. The auto/manual power mode allows the user to enable or disable the automatic time of day on/off functions. The set auto power time mode enable the user to set the time at which the pager will automatically turn off or on. The set time of day mode allows the user to set the pager's time of day clock. The set read mode allows the user select the manner in which a message will be displayed, for example, line scrolling or character scrolling. The chronograph mode allows the user to operate the stop watch functions of the pager. And, the set default mode allows the user to set the default values 42 of the menu items 40.

Figure 3:
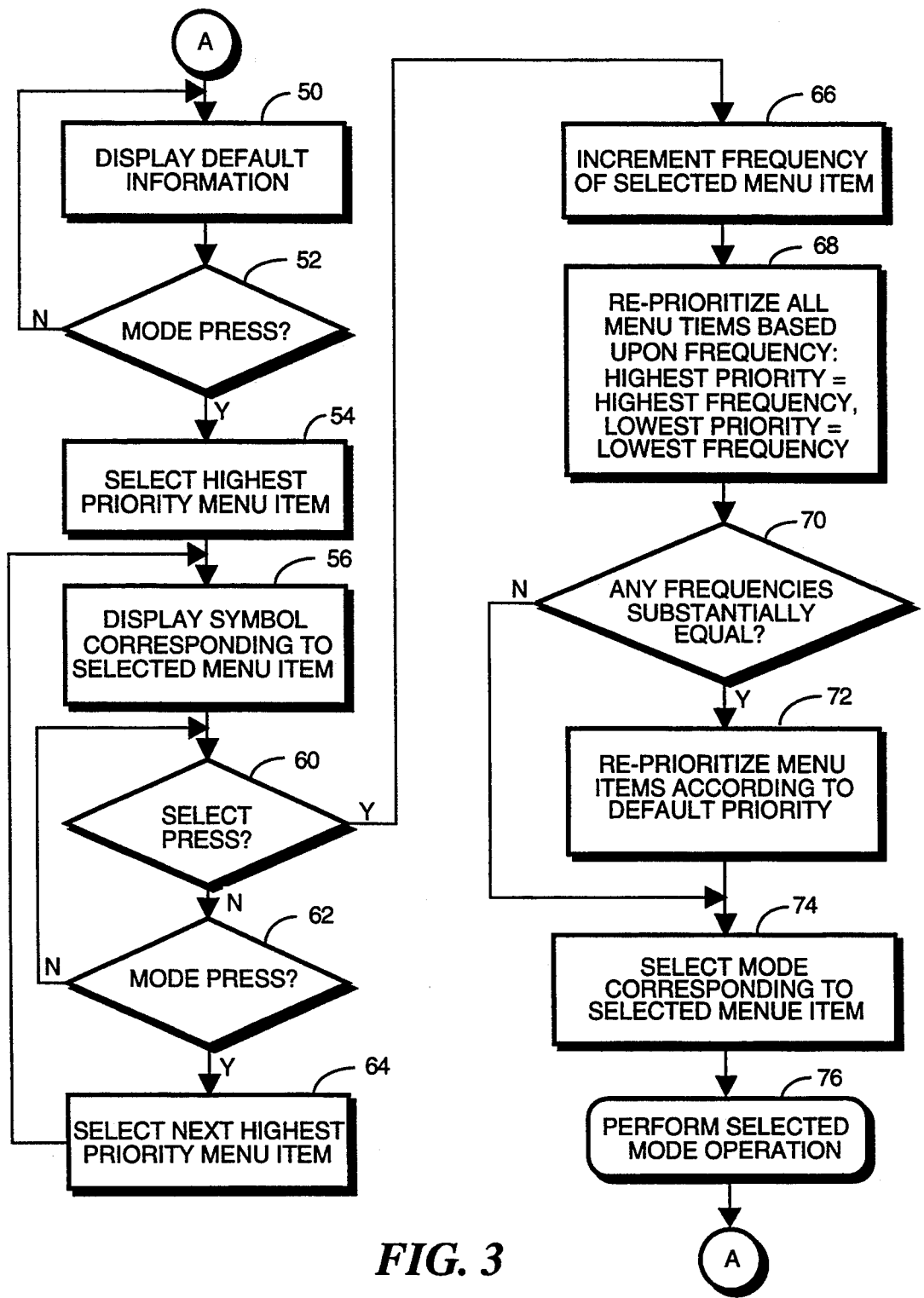
FIG. 3 is a flowchart representing the operation of the mode selection aspects of the pager in accord with the preferred embodiment of the present invention.

FIG. 3 is a flowchart representing the operation of the mode selection aspects of a pager in accord with the preferred embodiment of the present invention. In the idle state 50, display 22 is displaying default information such as the time of day in graphic display area 26 and pager status display area 24. In alternate embodiments the idle state display may be a set of dashes or a blank display in order to conserve additional power. This display is maintained until a first operation by the user of pressing mode switch 28, step 52. In step 54, the highest priority menu item is selected. Referring to FIG. 2, column 46 shows that the "read messages" menu item has the highest priority, a priority of one. Thus, the first menu item is selected in response to its priority. Then, step 56 displays in display area 26 the symbol corresponding to the selected menu item. Referring to column 40, the symbol is the text "READ MESSAGES", alternately, a foreign language equivalents or icon could be displayed. Steps 60 and 62 wait for subsequent operations by the user of either pressing the select switch 30 or the mode switch 28. Note that if neither of the switches are pressed after a predetermined time, the program returns to step 50 (not shown). If the mode switch is pressed, step 64 selects the next highest priority menu item, and step 56 displays its corresponding symbol. Referring to FIG. 2, the "protect messages" mode has the next highest priority of two. Then the graphic display area 26 will change from "READ MESSAGES" to "PROTECT MESSAGES". By these steps, a user is able to scroll down the list of menu items of column 40 in sequence with each press of the mode switch, the sequence of menu items is determined by the priority rating in column 46. Note, the sequence loops back to the highest priority menu item after the lowest priority menu item is displayed (not shown).

If the user presses the select switch 30, step 60 of FIG. 3, then the frequency, column 44, of the mode corresponding to the displayed menu item will be incremented. This corresponds to monitoring the selection by the user of the plurality of operating modes. Note, if a frequency counter overflows, all counters can be adjusted by dividing the values in the frequency counters by two (not shown). Then step 68 re-prioritizes the menu items base upon the frequency of selection of each menu item, wherein the highest frequency of selection receives the highest priority and the lowest frequency of selection receives the lowest priority. If however any two frequencies are substantially equal, step 70, then step 72 re-prioritizes the substantially equal menu items according to the default values. Substantially equal could be any value and may include menu items having frequencies within 5% of each other. Alternately, a hysterisis variable could be included to prevent menu items having substantially equal frequencies and selected at substantially equal rates from switching priority levels each time one or the other is selected. After re-prioritization, step 74 changes the operating mode of the pager to correspond to the menu item which was displayed when the select button was pressed at step 60. Then, step 76 performs the selected mode.

The re-prioritization aspects of the invention with respect to step 68 have the advantage of placing the menu items of the most frequently selected modes at the top of the list of menu items. Thus, the user is presented first with the menu items which the user is most likely to want to invoke. For example, the user of the pager having a priority according to FIG. 2 frequently reads, protects and erases messages and sets the alert volume. This reflects someone who would use a pager primarily for its messaging characteristics. Note, this user less frequently uses the alarm clock functions and infrequently uses the chronograph functions. Thus, an new and unused pager begins with a default sequence of menu items, and after a time, the pager monitors the user's mode selection habits and presents the menu items in a sequence customized to the particular user. Other users may have more use for the alarm functions while still others may have more use for the chronograph functions. After a time, each of these users will have a customized menu selection sequence with either the alarm or chronograph functions occurring earlier in the menu selection sequence.

The re-prioritization aspects with respect to steps 70 and 72 resolve the problem of prioritizing menu items having a substantially equal frequency. For example and with reference to FIG. 2, while the frequency of the "erase messages" is slightly higher than the frequency of the "read messages", their frequencies are nevertheless substantially equal because they are within five percent of each other. Consequently, the default column gives the "read messages" a higher priority even though its frequency is the lower of the two. Thus, the priority of these two is a function of both the frequency and the default columns. Furthermore, steps 70 and 72 can prevent rapid changing of the sequence menu items which have substantially the same frequency and are selected at substantially the same rate. This may be accomplished with the aforementioned hysteresis.

Still further, when a user receives a new pager, it will be programmed with a predetermined default list, column 42. Also, the frequencies of the menu items, column 44, may be set to zero, or to predetermined initial values. If predetermined initial values were used, the frequency of the lowest default menu item (set default) could be set to five, with frequency increasing by five with each increasing default, thus giving the highest value default (read messages) an initial frequency setting of eighty. The predetermined initial values may be factory set or reset by a user initialed operation.

Figure 4:
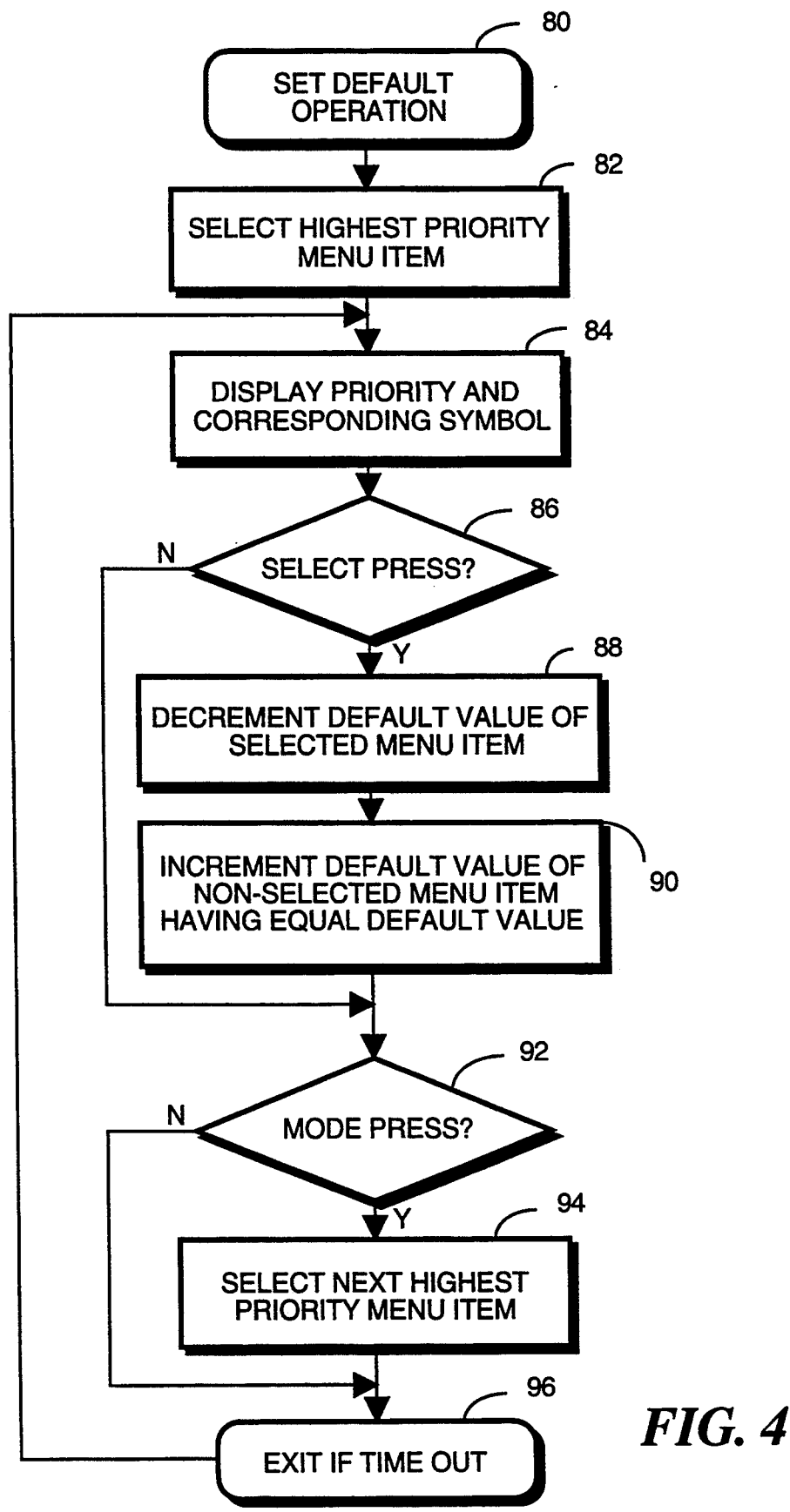
FIG. 4 shows a flowchart of the user selectable set default operation in accord with the preferred embodiment of the present invention.

FIG. 4 shows a flowchart of the user selectable set default operation in accord with the preferred embodiment of the present invention. The flow chart is entered at step 80, from step 76 of FIG. 2, if this mode is selected. Step 82 then selects the highest priority menu item and step 84 displays the symbol corresponding to the selected menu item. If select is pressed, step 86, then the default value of the selected menu item is decremented, step 88, and default value of the non-selected menu item is incremented. This has the effect of advancing a selected menu item up the default list. If the mode switch is pressed, step 92, then the next highest priority menu item is selected, step 94. Step 96 exits if there have been no switch presses within a predetermined time, alternately step 84 displays the selected menu item.

The flowchart of FIG. 4 shows how a user may set the default value of each menu item. In an alternate embodiment where the frequency column 44, and the frequency re-prioritization aspects steps 66 and 68 are eliminated, the flowchart of FIG. 4 gives the advantage of allowing the user to completely select the sequence of menu items displayed on the pager.

Figures 5, 6:
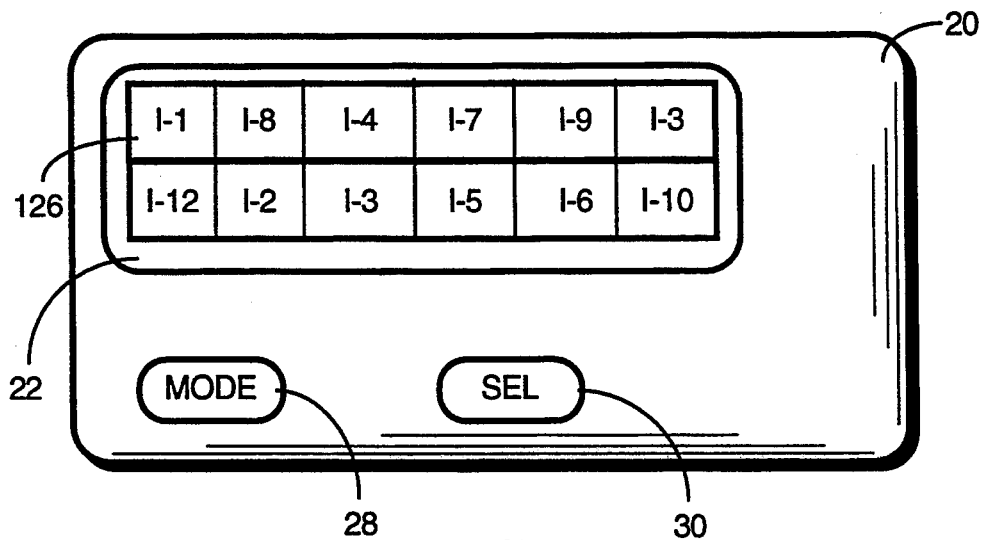
FIG. 5 shows a front view of a device operating in accord with an alternate embodiment of the present invention.
FIG. 6 shows a table of menu items in accord with the alternate embodiment of the present invention.

FIG. 5 shows a front view of a pager 20 operating in accord with an alternate embodiment of the present invention. Items 20, 22, 28 and 30 have the same function as identically numbered items of FIG. 1. Basically, graphic display area 126 corresponds to display area 26 of FIG. 1 but it has been expanded to include substantially all of LCD 22. Furthermore, areas of twelve icons, I-1 to I-12 are identified within display area 22. The twelve icons correspond to menu items.

FIG. 6 shows a table of menu items in accord with the alternate embodiment of the present invention. Column 140 is a list of menu items from which the user may select an operating mode of the pager. Column 142 represents the default priority assigned to each menu item which indicates the initial order of the menu item as well as identifying an icon indicative of the menu item. For example I-4 of FIG. 5 correspond to an icon of priority default 4, column 142, which is the set alert volume menu item. The icon corresponding to the set alert volume could be a transducer with lines indicating variable volume levels. Similarly, other menu items could have other icons commonly understood to represent the corresponding operating mode. Column 144 corresponds to column 44 of FIG. 2 and represents the number of times a user has selected a particular operating mode of the pager. Column 146 corresponds to column 46 of FIG. 2 and represents the priority of the menu item as it will be displayed in display area 26.

Figure 7:
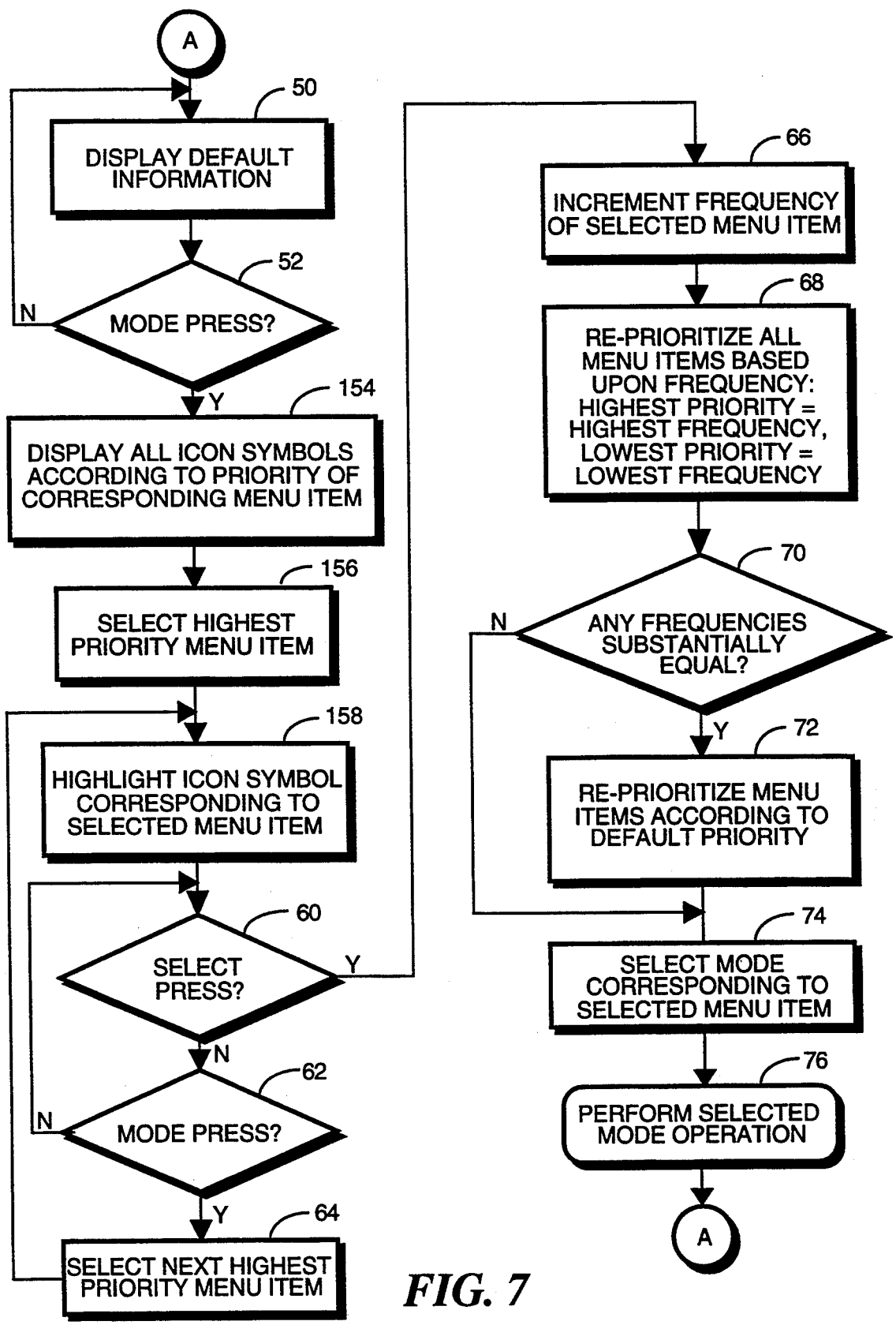
FIG. 7 is a flowchart representing the operation of the mode selection aspects of the pager in accord with the alternate embodiment of the present invention.

FIG. 7 is a flowchart representing the operation of the mode selection aspects of a pager in accord with the alternate embodiment of the present invention. Steps 50 to 52 and 60 to 76 correspond to identically numbered steps of FIG. 3. The operation is different with respect to placing icons within display area 126. Step 154 displays all icon symbols according to the priority of the corresponding menu item. Then step 156 selects the highest priority menu item. Step 158 highlights the selected menu item. This may be done by underlining of flashing the selected menu item. Similar to the flowchart of FIG. 3, menu items are highlighted by pressing of the mode switch 28, and modes are selected and re-prioritized by pressing the select switch 30.

The alternate embodiment has the advantage of displaying a menu of a multiplicity of icons for mode selection of the pager, wherein the sequence of menu items is automatically customized based upon the usage habits of the user. For example, the menu item icon corresponding to the most frequently selected mode (read messages) is in the upper left portion of display area 126, with the next highest priority menu item icon (protect messages) immediately to its right, and so on in sequence until the lowest priority menu item (chronograph) is in the lower left portion of the display area 126.

Thus, what is provided is a plurality of methods for automatically adjusting the sequence of menu items on an electronic device based upon the way the user uses the device.

We claim:

1. In an information display device having a plurality of operating modes and a corresponding plurality of menu items, each menu item associated with a respective operating mode, a method of providing for selection by a user of the device of one of the plurality of menu items comprises the steps of:

monitoring selection by the user of the plurality of operating modes:

assigning an adaptive priority to each of the plurality of menu items in response to said step of monitoring, said adaptive priority ranging from a highest priority menu item to a lowest priority menu item, assigning a predetermined default priority to each menu item, said step of monitoring further comprises the step of determining a frequency of selection of each of the plurality of operating modes, said step of assigning an adaptive priority further comprises the step of assigning priority to each of the plurality of menu items in response to the frequency of selection, wherein the highest priority menu item is assigned in response to a most frequently selected operating mode and the lowest priority menu item is selected in response to a least frequently selected operating mode, and wherein if at least two of the operating modes have a substantially similar frequency of selection, then said step of assigning an adaptive priority further comprises the step of assigning in response to the predetermined default priority of each of the menu items corresponding to the at least two operating modes.

2. The method according to claim 1 further comprising the step of, in response to a first operation by the user, displaying on a display means a plurality of symbols corresponding to the plurality of menu items in a sequence corresponding the priority of each of the plurality of menu items.

3. The method according to claim 2 wherein each symbol of the plurality of symbols corresponds to an icon indicative of each of the plurality of menu items, and wherein the plurality of symbols are arranged on the display means, and the symbol corresponding to the highest priority menu item is in an upper left most position of the plurality of symbols.

4. The method according to claim 2 further comprising the step of selecting a first operating mode corresponding to the highest priority mode selection.

5. In an information display device having a plurality of operating modes and a plurality of menu items for display on the display device, wherein each menu item corresponds to a respective operating mode, a method of adaptively changing a sequence of the menu items for display from which a user selects the operating mode of the device, the method comprising steps of:

assigning a default priority for each menu item to arrange the menu items in a sequence for display by the display device;

monitoring selection by the user of operating modes;

accumulating a selection count for each operating mode of the number of times that each operating mode is selected by a user;

re-ordering the sequence of the menu items in accordance with the selection count for each operating mode so that the menu items corresponding to the more frequently selected operating modes have higher priority in the sequence than menu items corresponding to less frequently selected operating modes, and when two operating modes have substantially equal selection counts their corresponding menu items are arranged in the sequence in accordance with their respective default priorities.

6. The method of claim 5, wherein the step of assigning comprises programming a default priority for each menu item by the user.

7. The method of claim 5, wherein said step of re-ordering is performed after operating mode selection made by a user.

8. The method of claim 5, wherein the plurality of operating modes comprises: read pages; protect pages; erase messages; power off; set alarm; set alerts; enable auto on-off; set auto on-off; set time; set read mode; and chronograph.

9. The method of claim 8, and further comprising the step of displaying the menu items one-at-a-time.

10. The method of claim 8, and further comprising the step of simultaneously displaying icons representative of the plurality of menu items in an orientation in accordance with the sequence.

* * * * *